United States Patent [19]

Murai et al.

[11] Patent Number: 5,517,331
[45] Date of Patent: May 14, 1996

[54] METHOD AND APPARATUS FOR READING IMAGE OF IMAGE SCANNER-READER

[75] Inventors: Yukako Murai; Tamio Amagai, both of Kawasaki, Japan

[73] Assignee: Fujitsu Limited, Kawasaki, Japan

[21] Appl. No.: 385,582

[22] Filed: Feb. 8, 1995

Related U.S. Application Data

[63] Continuation of Ser. No. 79,783, Jun. 22, 1993, abandoned.

[30] Foreign Application Priority Data

Jun. 22, 1992 [JP] Japan .................................. 4-162552
Jun. 24, 1992 [JP] Japan .................................. 4-165856

[51] Int. Cl.$^6$ .................................................. H04N 1/04
[52] U.S. Cl. ........................ 358/486; 358/412; 358/413; 358/474; 358/404; 358/444; 358/451; 358/46G31522
[58] Field of Search .................................. 358/486, 471, 358/474, 494, 496, 487, 451, 412, 409, 413, 505, 506

[56] References Cited

U.S. PATENT DOCUMENTS

| | | | |
|---|---|---|---|
| 4,160,279 | 7/1979 | Fuwa | 358/486 |
| 4,748,514 | 5/1988 | Bell | 358/486 |
| 5,221,976 | 6/1993 | Dash et al. | 358/486 |
| 5,239,387 | 8/1993 | Stein et al. | 358/486 |
| 5,239,393 | 8/1993 | Takeuchi | 358/412 |
| 5,260,811 | 11/1993 | Morikawa | 358/412 |
| 5,278,675 | 1/1994 | Kamiyama | 358/412 |

FOREIGN PATENT DOCUMENTS

| | | |
|---|---|---|
| 0074795 | 3/1983 | European Pat. Off. . |
| 0081767 | 6/1983 | European Pat. Off. . |
| 0212487 | 3/1987 | European Pat. Off. . |
| 0320756 | 6/1989 | European Pat. Off. . |
| 0430452 | 6/1991 | European Pat. Off. . |
| 0458693 | 11/1991 | European Pat. Off. . |
| 0466461 | 1/1992 | European Pat. Off. . |
| 54-065433 | 5/1979 | Japan . |
| 61-150082 | 7/1986 | Japan . |
| 62-055777 | 3/1987 | Japan . |
| 1-208072 | 8/1989 | Japan . |
| 2-036964 | 2/1990 | Japan . |
| 3-045075 | 2/1991 | Japan . |

OTHER PUBLICATIONS

Cassada et al., "Graphic Communication System Incorporating Scan Resolution Control," *IBM Technical Disclosure Bulletin*, vol. 15, No. 8, Jan. 1973, p. 2367.
Patent Abstracts of Japan, vol. 5, No. 23 (E-45) 12 Feb. 1981 & JP-A-55 150662 (Fujitsu Ltd.) 22 Nov. 1980.
Patent Abstracts of Japan, vol. 6, No. 251 (E-147) 10 Dec. 1982 & JP-A-57 148467 (Mitsubishi Denki KK) 13 Sep. 1982.
Patent Abstracts of Japan, vol. 8, No. 141 (P-283) 30 Jun. 1984 & JP-A-59 041054 (Toshiba Denki K.K.) 7 Mar. 1984.
Patent Abstracts of Japan, vol. 14, No. 22 (E-874) 17 Jan. 1990 & JP-A-01 264062 (Tokyo Electric Co., Ltd.) 20 Oct. 1989.

Primary Examiner—Scott A. Rogers
Assistant Examiner—Fan Lee
Attorney, Agent, or Firm—Staas & Halsey

[57] ABSTRACT

An image scanner-reader has an image read unit, and an employing control unit. The image read unit is used to read an original document and provide image data of the original document. The employing control unit is used to control the relative moving speed between the original document and the image read unit, and when an original document reading operation is suspended, the employing control unit controls the restart of the reading operation after decreasing the relative moving speed to a slow reading speed of the original document. Therefore, when the image data buffer becomes full enough to cause a suspension state, and the read operation is restarted after changing control conditions, so that the quantity of data transferred to the image data buffer is reduced. Namely, according to the present invention, the number of occurrences of the suspension state can be greatly reduced, and thereby the overal reading speed can be improved without increasing the data receiving speed of a host device.

13 Claims, 17 Drawing Sheets

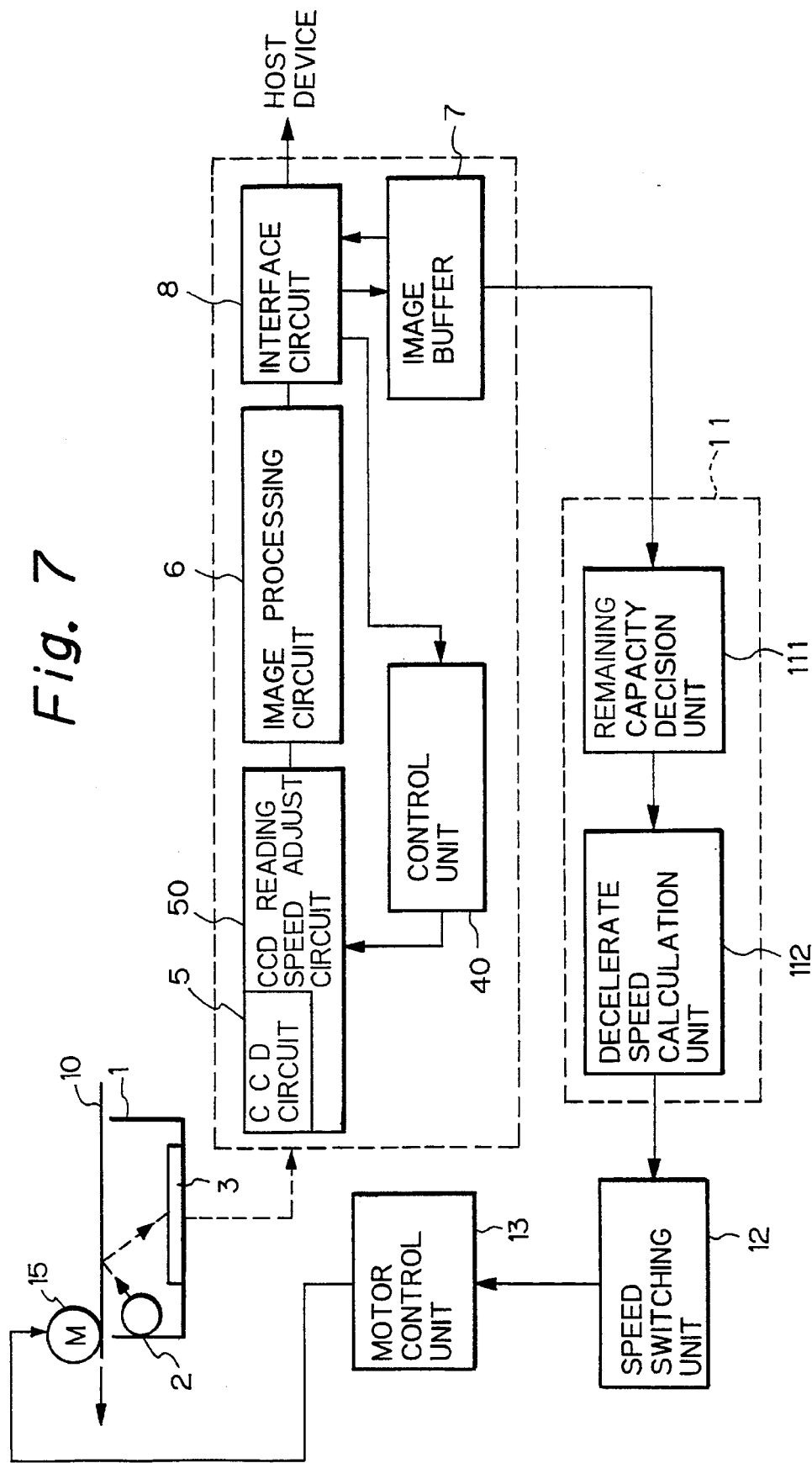

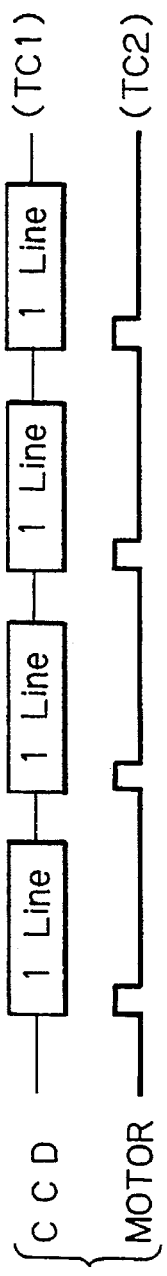
Fig. 8A
Fig. 8B
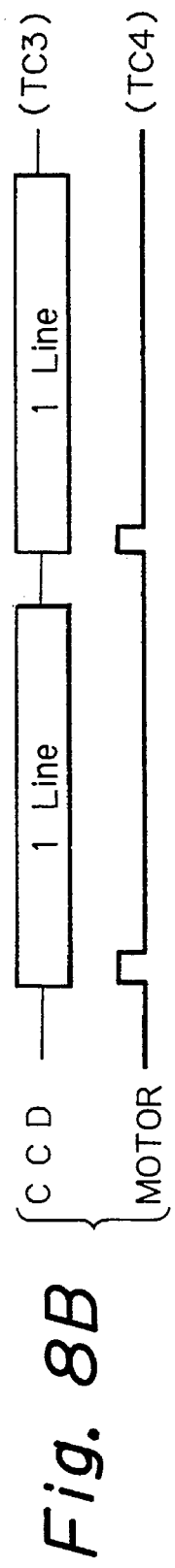
Fig. 9
| OCCURRENCE NUMBER OF SUSPENSION STATE | CCD's READING SPEED | MOVING SPEED OF ORIGINAL DOCUMENT/PHOTOELECTRIC READ |
|---|---|---|
| 1 | 1/n | 1/n |
| 2 | 1/(n+m) | 1/(n+m) |
| 3 | 1/(n+2m) | 1/(n+2m) |
| .... | .... | .... |

Fig. 10

| | OCCURRENCE NUMBER OF SUSPENSION STATE | READ SPEED | RESOLUTION CONVERSION RATIO (SUB SCANNING) |
|---|---|---|---|
| FIRST READ OPERATION | 1 | 1/n | 1/n |
| | 2 | 1/(n+m) | 1/(n+m) |
| | 3 | 1/(n+2m) | 1/(n+2m) |
| | .. | .. | .. |
| SECOND READ OPERATION | 1 | 1/n | 1/n |
| | 2 | 1/(n+m) | 1/(n+m) |
| | 3 | 1/(n+2m) | 1/(n+2m) |
| .. | .. | .. | .. |

Fig. 11

| OCCURRENCE NUMBER OF SUSPENSION STATE | READ SPEED | RESOLUTION CONVERSION RATIO (SUB SCANNING) |
|---|---|---|
| 1 | 1/n | 1/n |
| 2 | 1/(n+m) | 1/(n+m) |
| 3 | 1/(n+2m) | 1/(n+2m) |
| ‥ | ‥ | ‥ |
| i | 1/(n+(i−1)m) | 1/(n+(i−1)m) |
| 1 | 1/(n+(i−1)m) | 1/(n+(i−1)m) |
| 2 | 1/(n+im) | 1/(n+im) |
| 3 | 1/(n+(i−1)m) | 1/(n+(i−1)m) |
| ‥ | ‥ | ‥ |
| i | 1/(n+(2i−1)m) | 1/(n+(2i−1)m) |
| 1 | 1/(n+(2i−1)m) | 1/(n+(2i−1)m) |
| 2 | 1/(n+2im) | 1/(n+2im) |
| 3 | 1/(n+(2i−1)m) | 1/(n+(2i−1)m) |
| ‥ | ‥ | ‥ |
| i | 1/(n+(3i−1)m) | 1/(n+(3i−1)m) |
| ‥ | ‥ | ‥ |

FIRST READ OPERATION / SECOND READ OPERATION / THIRD READ OPERATION

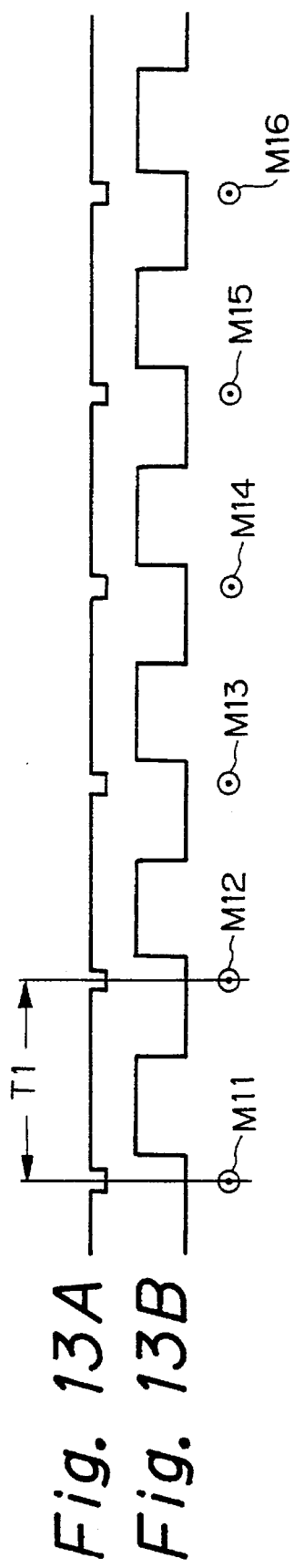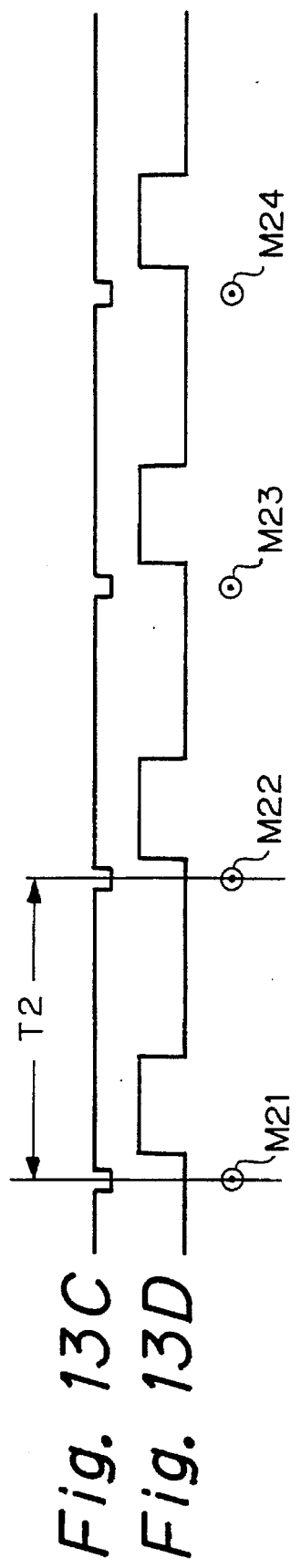
Fig. 13A
Fig. 13B
Fig. 13C
Fig. 13D

Fig. 18A
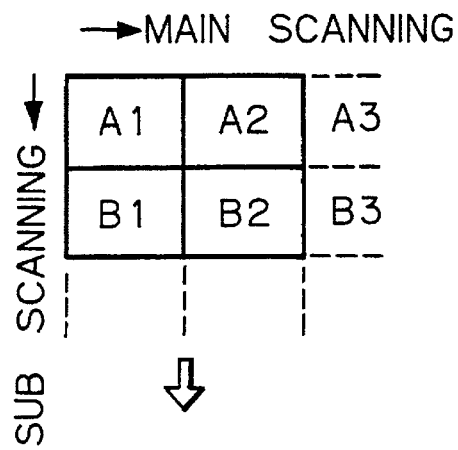
Fig. 18B
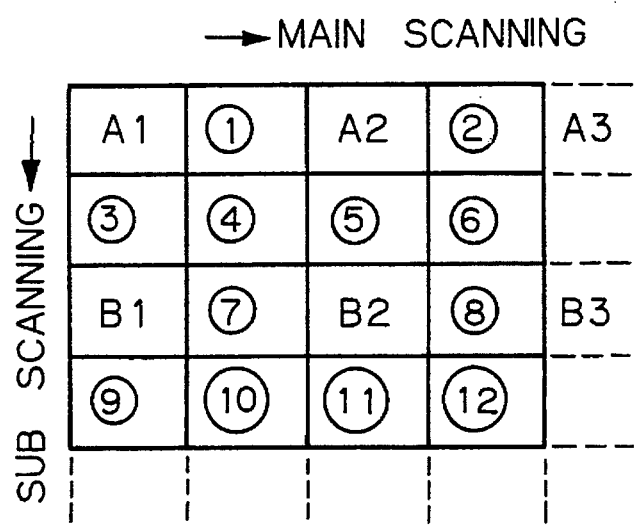
Fig. 18C
$$\begin{cases} ①=(A1+A2)/2 \\ ②=(A2+A3)/2 \\ ③=(A1+B1)/2 \\ ④=(③+⑤)/2 \\ ⑤=(A2+B2)/2 \\ ⑥=(②+⑧)/2 \\ ⑦=(B1+B2)/2 \\ ⑧=(B2+B3)/2 \end{cases}$$
．
．
．

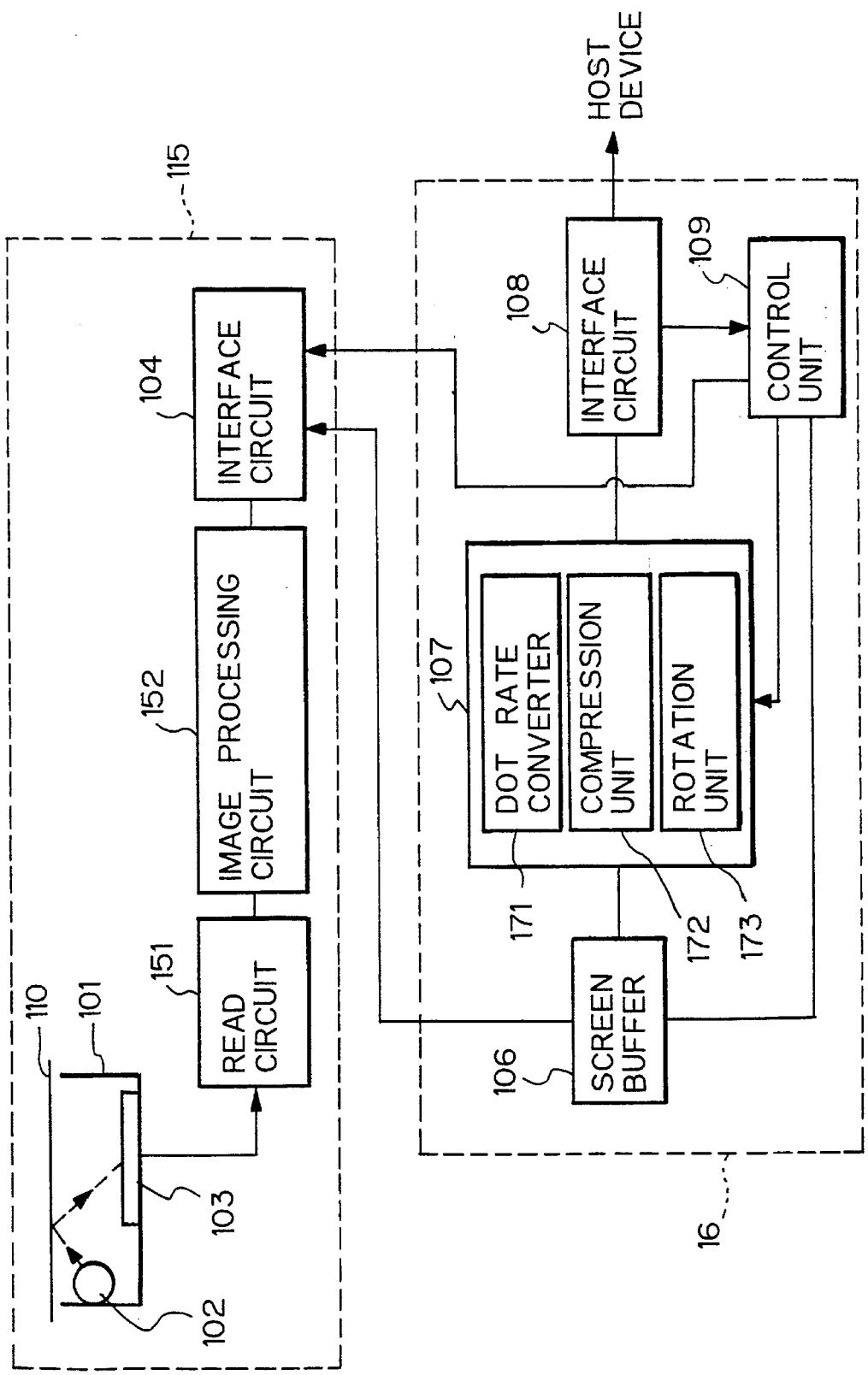

METHOD AND APPARATUS FOR READING IMAGE OF IMAGE SCANNER-READER

This application is a continuation of application Ser. No. 08/079,783, filed Jun. 22, 1993, now abandoned.

BACKGROUND OF THE INVENTION

1. Field of the Invention

The present invention relates to an image scanner-reader and a reading method thereof, and more particularly, to an image scanner-reader and a reading method thereof capable of dealing with a suspension of read operation of the image scanner due to conditions at a host processor. Further, the present invention relates to an image scanner-reader capable of reading an original document and carrying out a plurality of processes such as resolution conversion, compression, and rotation on the once read data.

2. Description of the Related Art

Recently, in accordance with popularization of computers, wordprocessors, and the like, a plurality of image scanner-readers have been studied and developed. Typically, the image scanner-reader of the related art has a photoelectric reader for reading an original document. The photoelectric reader includes a light source for irradiating the original document and a printed circuit board for receiving reflected light and providing image data.

The printed circuit board has a CCD (Charge Coupled Device) circuit, an image processing circuit, an image data buffer, and an interface circuit. The image data buffer is used to temporarily store image data composed of binary values provided by the image processing circuit. Note, the capacity of the image data buffer must be reduced in order to make the image scanner more compact and low cost. The buffer will store a full page of the original document.

Therefore, when the reading speed of the scanner is fast and the image data processing speed of the host device such as a personal computer is slow, the image data buffer becomes full of data and can not receive more data. In this case, the reading operation must be suspended. To suspend the reading operation, the moving original document or photoelectric reader must be stopped. When the image data receiving speed of the host device is slow, stopping and restarting operations will be frequently repeated. This drastically reduces the reading speed.

Note the image scanner-reader of the related art further may have a screen buffer, and the image processing circuit may be used to carry out processes such as resolution conversion, compression, and rotation on the image data. For example, when the host device continuously provides an instruction to transmit 30-degrees-rotated image data of the original document, the image scanner-reader again reads the original document, stores read image data in the screen buffer, rotates the data by 30 degrees in the image processing circuit, and sends the rotated data to the host device. Namely, the image scanner-reader of the related art must repeatedly read the original document for each of consecutive instructions such as resolution conversion, compression, and rotation instructions that are provided from the host device for the same original document. This raises a problem of increasing the image processing period.

SUMMARY OF THE INVENTION

An object of the present invention is to provide a an image scanner-reader that is capable of reducing the number of restart operations and improving the overall read speed without increasing the data receiving speed of the host device. Further, another object of the present invention is to provide an image scanner-reader capable of reducing the processing time when a series of instructions are given for the same data.

According to the present invention, there is provided an image scanner-reader comprising an image read unit for reading an original document and providing image data of the original document, an employing control unit for controlling the relative moving speed between the original document and the image read unit. When an original document reading operation is suspended, the employing control unit controls the restart of the reading operation after reducing the relative moving speed to a slow reading speed.

The printed circuit board include a resolution conversion unit for converting a resolution of the data provided by the image read unit. The resolution conversion circuit may lower the resolution of the data provided by the image read unit when the relative moving speed is decreased. The printed circuit board includes a CCD reading speed adjust unit for adjusting a CCD scan speed. The CCD reading speed adjust unit may decrease the CCD scan speed when the relative moving speed is decreased. A reading speed after restarting the suspended read operation may be determined depending on the quantity of data transmitted to a host device.

The image read unit comprises a light source for irradiating the original document and a printed circuit board for receiving reflected light from the original document and provide the image data of the original document. The printed circuit board comprises a CCD circuit, an image processing circuit for converting an output of the CCD circuit into binary signals; an image data buffer for temporarily storing image data composed of the binary values provided by the image processing circuit; and an interface circuit for transferring the image data into the image data buffer and send the image data from the image data buffer to a host device.

The employing control unit comprises a motor for moving the image read unit or moving the original document, and controls the speed of the image read unit or the original document.

According to the present invention, there is also provided a method of reading the original document by an image scanner-reader having an image read unit and an image data buffer. The method comprises the steps of reading an original document and providing image data of the original document, suspending an original document reading operation, when the image data buffer becomes full of data and cannot to receive more data, and decreasing a relative moving speed between the original document and the image read unit and restarting the original document reading operation.

When image data buffer becomes full of data and cannot receive more data, a resolution of the binary data provided by the image read unit is lowered in accordance with decreasing the relative moving speed. When the image data buffer becomes full of data and cannot receive more data, a CCD scan speed may be decreased in accordance with decreasing the relative moving speed. A reading speed after restarting the suspended read operation is determined depending on the quantity of data transmitted to a host device.

Further, according to the present invention, there is provided an image scanner-reader for processing image data, and transmitting the processed data to a host device, wherein the image scanner-reader comprises a screen buffer for storing digital image data of an original document read by a read unit, an image processing unit for processing the image data stored in the screen buffer and a control unit for erasing the image data stored in the screen buffer in response to an end signal provided by the host device, wherein all instructions before the end signal output from the host device are executed on the image data stored in the screen buffer.

The image processing unit may include a plurality of processing units such as a resolution conversion unit, a rotation unit, and a compression unit.

BRIEF DESCRIPTION OF THE DRAWINGS

The present invention will be more clearly understood from the description of the preferred embodiments as set forth below with reference to the accompanying drawings, wherein:

FIG. 7 is a block diagram showing another embodiment of an image scanner-reader using a reading method according to a first aspect of the present invention;

FIGS. 8A, 8B, and 9 are diagrams for explaining the operations of the image scanner-reader shown in FIG. 7;

FIG. 10 is a diagram for explaining a read operation of the first aspect of the present invention;

FIG. 11 is a diagram for explaining another read operation of the first aspect of the present invention;

FIGS. 13A to 13D are timing charts for explaining a scanning operation of the first aspect of the present invention;

FIGS. 18A, 18B, and 18C are diagrams for explaining the operations of the image scanner-reader shown in FIG. 16; and FIG. 19 is a block diagram showing an embodiment of another image scanner-reader according to a second aspect of the present invention.

DESCRIPTION OF THE PREFERRED EMBODIMENTS

For a better understanding of the preferred embodiments, the problems of the related art in relation to a first aspect of the present invention will be explained, with reference to FIG. 1.

Figure 1:
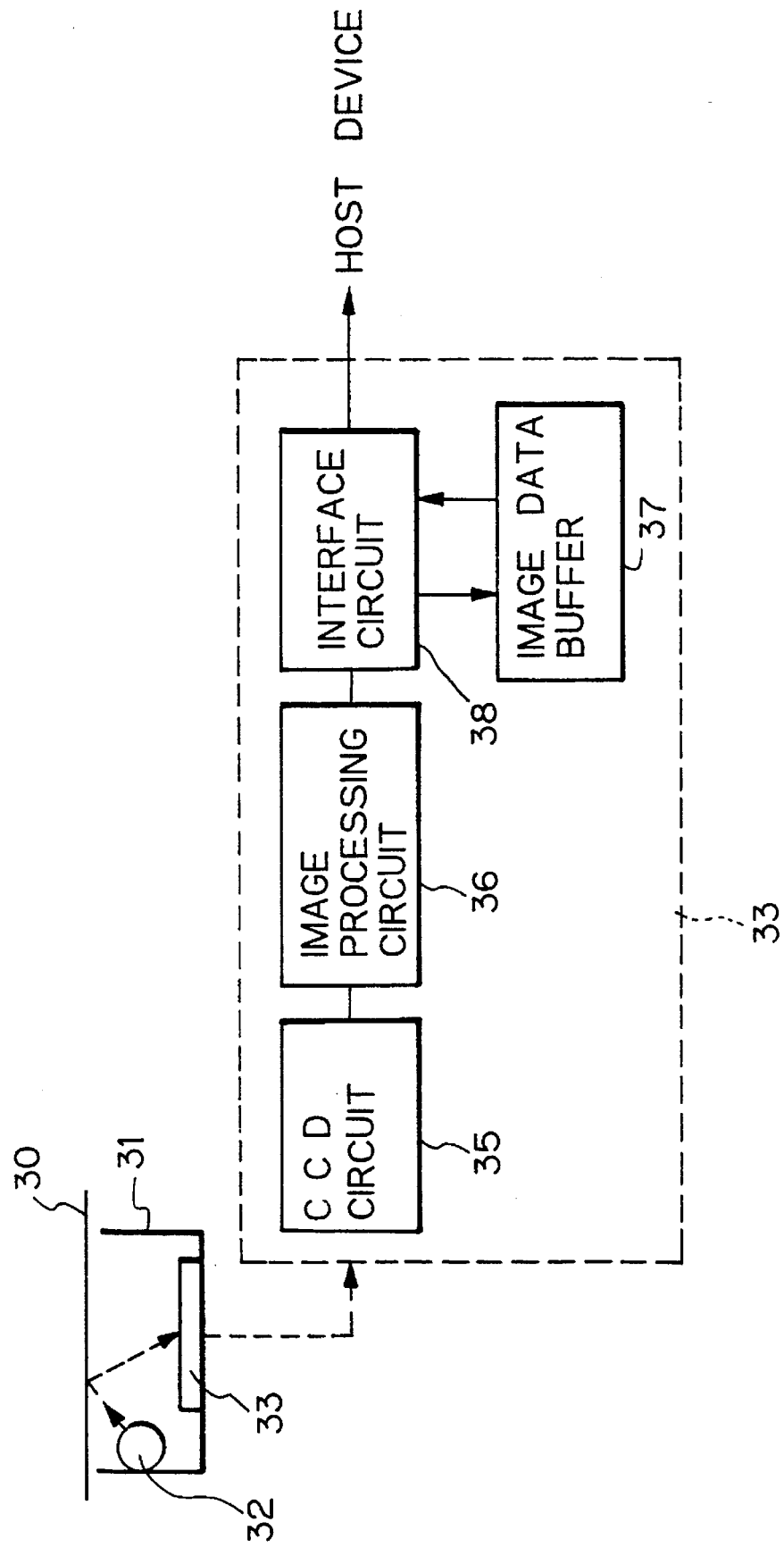
FIG. 1 is a block diagram showing an example of an image scanner-reader according to the prior art.

FIG. 1 shows an example of an image scanner-reader according to the prior art. In FIG. 1, reference numeral 30 denotes an original document, 31 denotes a photoelectric reader, 32 denotes a light source, and 33 denotes a printed circuit board.

The photoelectric reader 31, which includes the light source 32 and the printed circuit board 33, is used to read the original document 30 and provide image data thereof. The light source 32 is used to irradiate the original document 30, and the printed circuit board 33 is used to receive reflected light and provide an image data.

The printed circuit board 33 has a CCD circuit 35, an image processing circuit 36, an image data buffer 37, and an interface circuit 38. The CCD circuit 35 includes CCDs and a CCD control circuit for controlling the CCDs. The image processing circuit 36 is used to convert an output of the CCD circuit 35 into digital values (multiple values) and convert the digital values into binary signals. The image data buffer 37 is used to temporarily store image data composed of the binary values provided by the image processing circuit 36. The interface circuit 38 is used to transfer the image data into the image data buffer 37 and send the image data from the image data buffer to a host device.

The original document 30 or the photoelectric reader 31 is moved while the CCD circuit 35 is reading the original document 30. The image processing circuit 36 converts the read analog signals into multiple values and then into binary signals, which are once stored in the image data buffer 37 through the interface circuit 38. The interface circuit 38 transfers the binary data to the host device. Note, the capacity of the image data buffer 37 must be reduced in order to make the image scanner more compact and low cost, and the buffer 37 will hardly store a full page of the original document 30.

While reading the original document 30, the image scanner temporarily stores read image data in the image data buffer 37 and transfers the stored data to the host device. When the reading speed of the scanner is fast and the image data processing speed of the host device 30 such as a personal computer is slow, the image data buffer 37 becomes too full of data to accept more data. In this case, the reading operation must be suspended. To suspend the reading operation, the original document or the photoelectric reader that is moving must be stopped. When the image data receiving speed of the host device is slow, stoppage and restart operations will be frequently repeated. This drastically deteriorates the overall reading speed. Note, the original document (or photoelectric reader) cannot be immediately stopped, and some line images may be omitted or the total image may shrink, so that the quality of the image decreases.

Below, the preferred embodiments of a first aspect of an image scanner-reader according to the present invention will be explained, with reference to FIGS. 2 to 13D.

Figure 2:
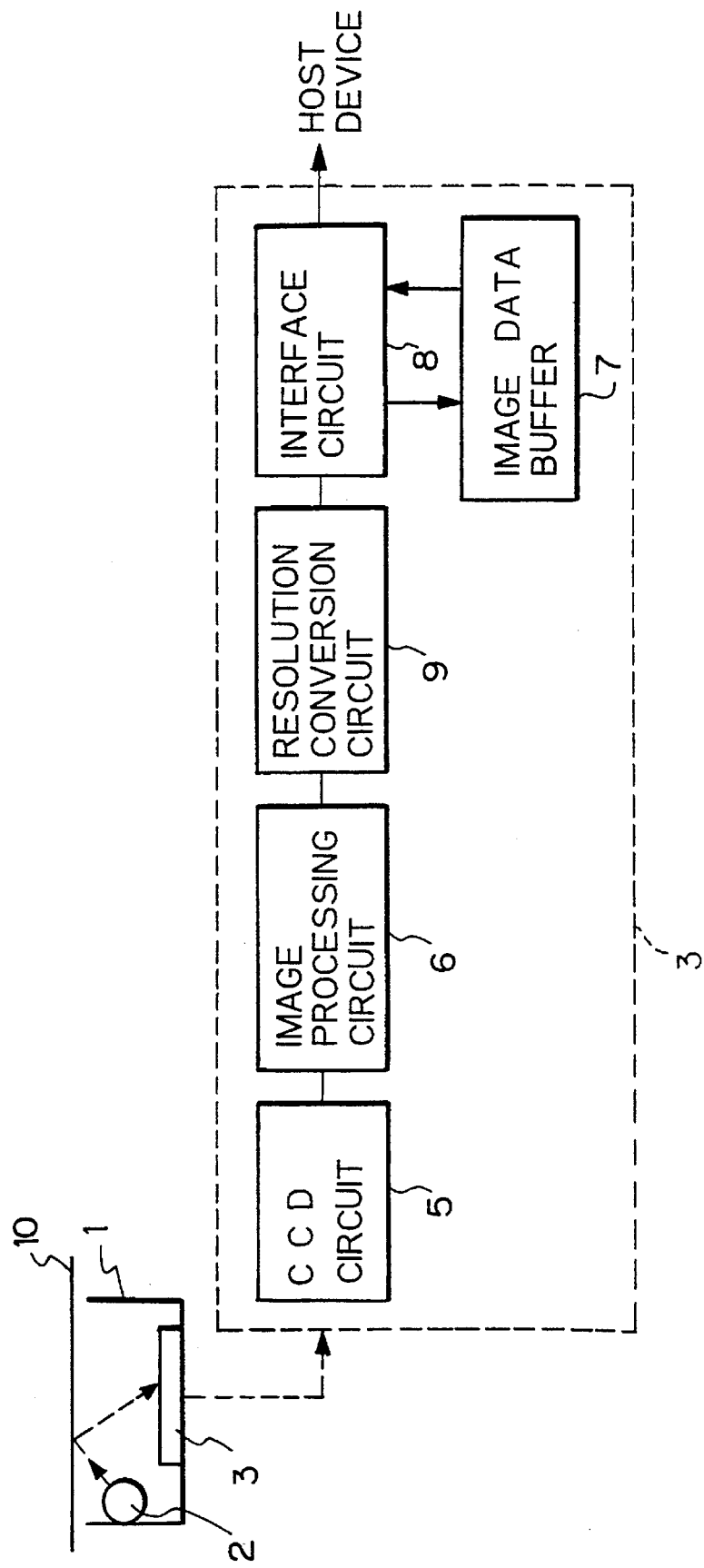
FIG. 2 is a block diagram showing a principle configuration of an image scanner-reader using a reading method according to a first aspect of the present invention.

FIG. 2 shows a principle configuration of an image scanner-reader using a reading method according to a first aspect of the present invention. In FIG. 2, reference numeral 10 denotes an original document, 1 denotes a photoelectric reader, 2 denotes a light source, and 3 denotes a printed circuit board. Note, the photoelectric reader 1 corresponds to the photoelectric reader 31 of FIG. 1, the light source 2 corresponds to the light source 32, the printed circuit board 3 corresponds to the printed circuit board 33, the CCD (Charge Coupled Device) circuit 5 corresponds to the CCD circuit 35, the image processing circuit 6 corresponds to the image processing circuit 36, the image data buffer 7 corresponds to the image data buffer 37, and the interface circuit 8 corresponds to the interface circuit 38.

The photoelectric reader 1, which includes the light source 2 and the printed circuit board 3, is used to read the original document 10 and provide image data thereof. The light source 2 is used to irradiate the original document 10, and the printed circuit board 3 is used to receive reflected light and provide image data.

The printed circuit board 3 has a CCD circuit 5, an image processing circuit 6, an image data buffer 7, an interface circuit 8, and a resolution conversion circuit 9. The CCD circuit 5 includes CCDs and a CCD control circuit for controlling the CCDs. The image processing circuit 6 converts an output of the CCD circuit 5 into digital values (multiple values) and convert the digital values into binary signals, which are sent to a resolution conversion circuit 9.

The image data buffer 7 temporarily stores image data composed of the binary values (binary signals) provided by the image processing circuit 6. The interface circuit 8 transfers the image data into the image data buffer 7 and send the image data from the image data buffer to a host device. Note, when an image data buffer 7 becomes full of data and cannot receive more data, the resolution conversion circuit 9 converts the resolution of the binary data provided by the image processing circuit 6. For example, the resolution conversion circuit 9 converts a resolution of 800 dpi (dot per inch) into 400 dpi.

In the image scanner-reader shown in FIG. 2, under a normal state, the resolution conversion circuit 9 operates in a through mode to pass binary image data from the image processing circuit 6 without alteration to the image data buffer 7 through the interface circuit 8.

When the image data buffer 7 becomes full of data and cannot store any more data, a suspension state occurs. A signal indicating this state is transferred to a controller (not shown). The controller suspends a read operation, decreases the speed of a motor (which will be shown in FIGS. 3 and 7) for moving the original document (or the photoelectric reader) to 1/n, e.g., ½ of the previous speed, and lowers a resolution conversion rate of the resolution conversion circuit 9 to 1/n, e.g., ½ of the previous value.

During the normal operation, the image processing circuit 6 may provide image data of the original document 10 at a resolution of, for example, 400 dpi. When the suspension state occurs to drop the speed of the motor for moving the original document to ½, the image processing circuit 6 will provide image data at a resolution of 800 dpi. Accordingly, the resolution conversion circuit 9 converts this resolution to 400 dpi. As a result, with the original document reading speed being halved, the reading process can be continued. This greatly reduces the number of stopping and restarting operations compared with the prior art.

Figure 3:
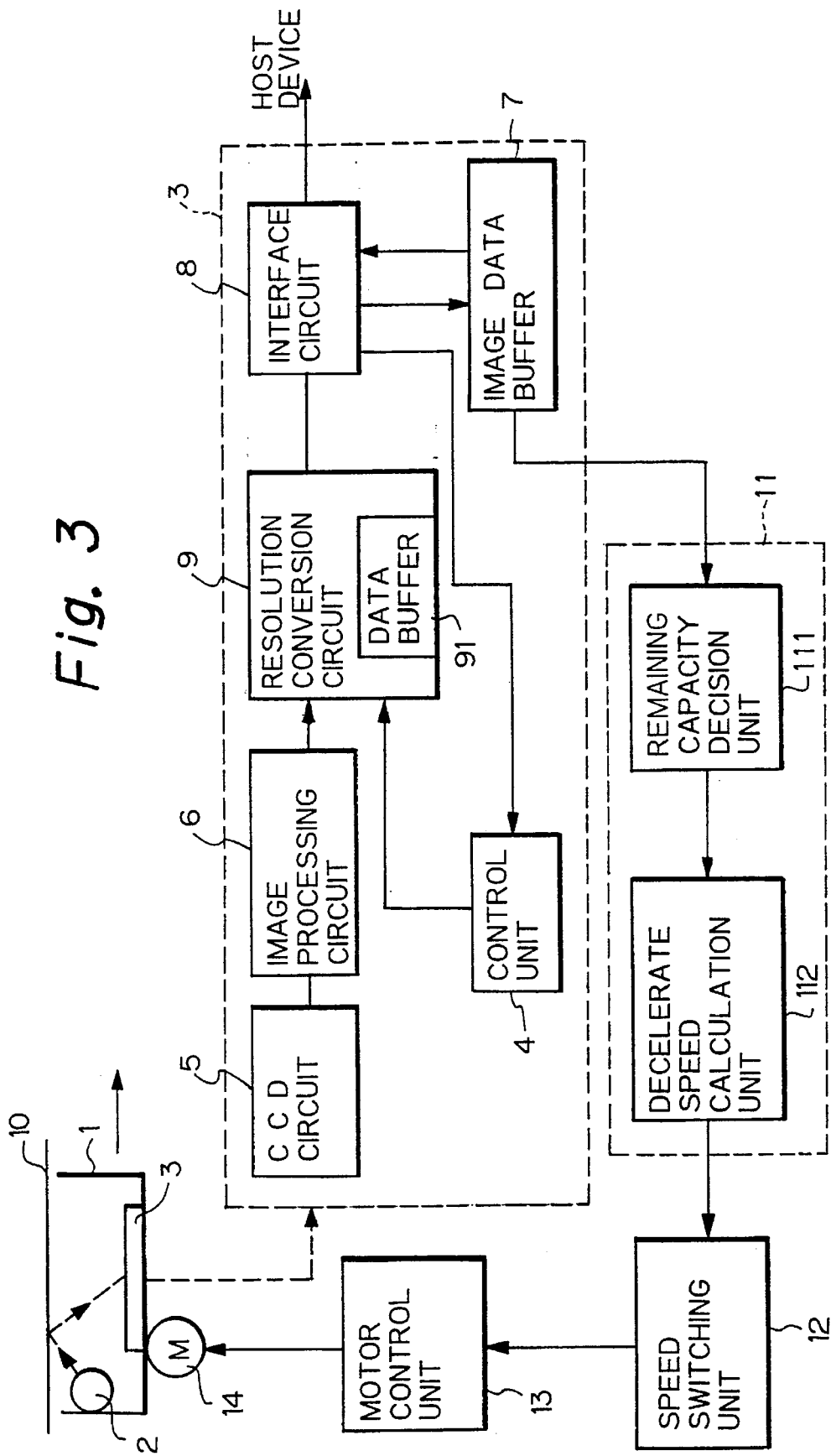
FIG. 3 is a block diagram showing an embodiment of an image scanner-reader using a reading method according to a first aspect of the present invention.

FIG. 3 shows an embodiment of an image scanner-reader using a reading method according to a first aspect of the present invention. Note, in FIG. 3, the same reference numerals as those of FIG. 2 denote the same elements thereof.

Further, in FIG. 3, reference numeral 4 denotes a controller, reference numeral 11 denotes a speed switching and decision circuit consisting of a remaining capacity decision unit 111 and a decelerate speed calculation circuit 112, reference numeral 12 denotes a speed switching unit, reference numeral 13 denotes a motor control unit, and reference numeral 14 denotes a motor. In this embodiment, the motor 14 is used to move the photoelectric reader 1.

The resolution conversion circuit 9 has a data buffer 91. In this embodiment, the capacity of the data buffer 91 is determined to be sufficient to store at least two lines of characters on the original document. Note, when the image data buffer 7 becomes full, the data stored in the data buffer 91 can be first transferred to the host device before changing the resolution of the resolution conversion circuit 9. Nevertheless, when the image data buffer 7 becomes full, the data stored in the data buffer 91 can be also transferred to the host device after changing the resolution of the resolution conversion circuit 9.

As shown in FIG. 3, the remaining capacity decision unit 111 detects the remaining capacity of the image data buffer 7, and when the remaining capacity decision unit 111 detects that the remaining capacity of the image data buffer 7 is zero, or the image data buffer 7 becomes full of data and cannot receive more data, the decelerate speed calculation unit 112 receives an output signal of the remaining capacity decision unit 111 and calculates the decelerate speed.

The speed switching unit 12 receives an output of the decelerate speed calculation unit 112 receives and switches the speed, and the motor control unit 13 control the motor 14 in accordance with an output signal of the speed switching unit 12. Consequently, the speed of the motor 14 (moving speed of the photoelectric reader 1) is, for example, decreased to ½ of the previous speed.

Further, as described above, the image data buffer 7 is used to temporarily store image data composed of the binary values provided by the image processing circuit 6. When the image data buffer 7 becomes full of data and cannot receive more data, the controller 4 controls a conversion rate of the resolution conversion circuit 9, so that the resolution conversion circuit 9, for example, converts a resolution of 800 dpi (dot per inch) into 400 dpi. Namely, the controller 4 provides the resolution conversion circuit 9 with an instruction to change the resolution of image data provided by the image processing circuit 6. For example, the resolution conversion circuit 9 reduces the resolution to 1/n (n being an integer equal to or greater than 2).

Namely, when the speed of the motor 14 is decreased to 1/n, the resolution of resolution conversion circuit 9 is changed to 1/n. Further, the moving speed of the photoelectric reader 1 is a relative speed between the original document 10 and the photoelectric reader 1.

Note, the speed switching and decision circuit 11, speed switching unit 12, and motor control unit 13 may be included in the controller 4. Namely, the controller 4 may control the motor 14 for moving the photoelectric reader 1, and also control the conversion rate of the resolution conversion circuit 9.

Figure 4:
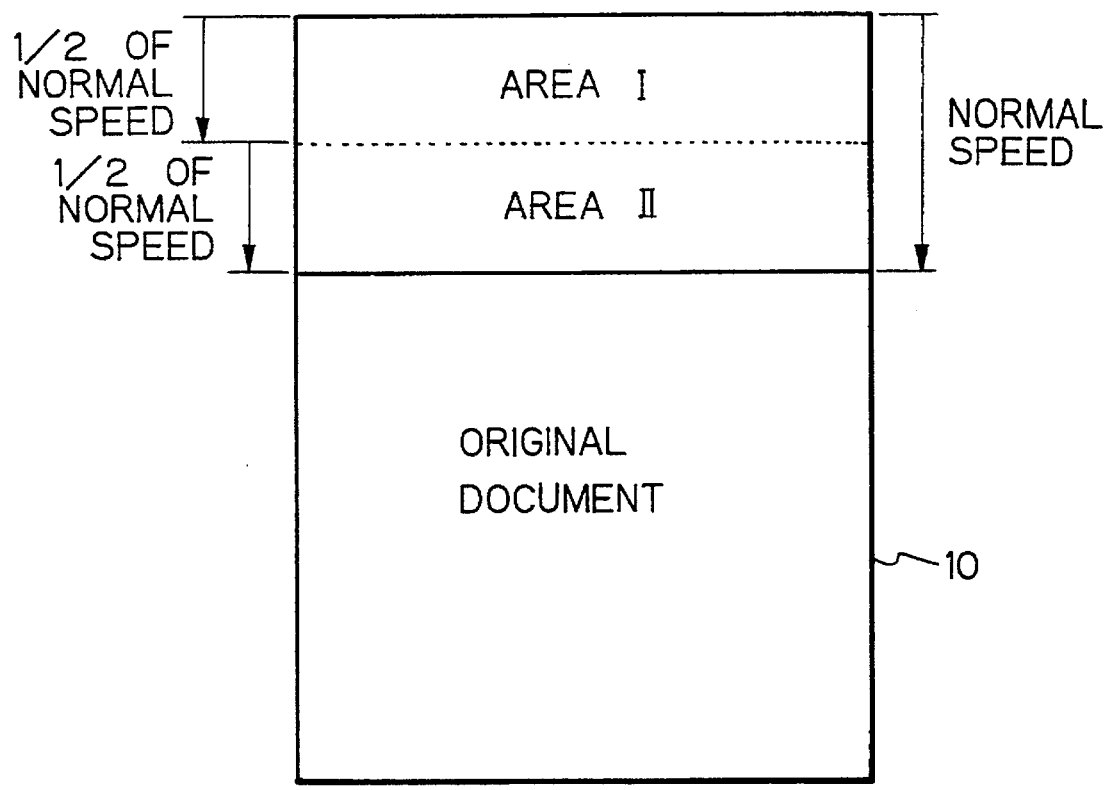
FIGS. 4, 5, and 6 are diagrams for explaining the operations of the image scanner-reader shown in FIG. 3.
Figures 5, 6:
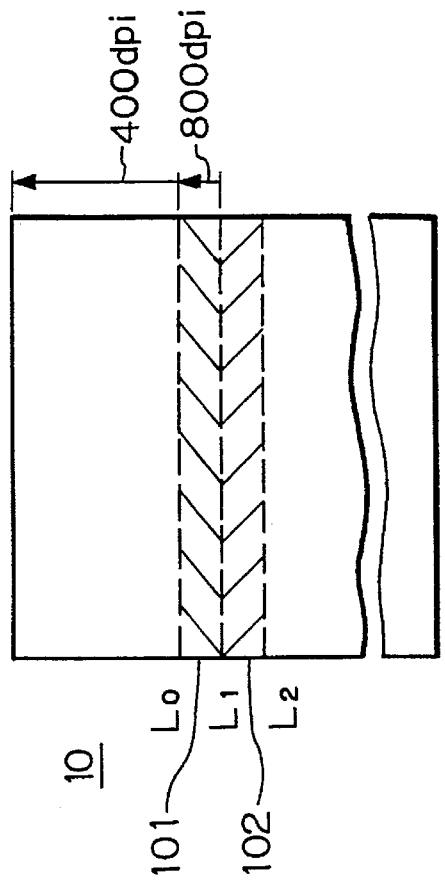

FIGS. 4, 5, and 6 are diagrams for explaining the operations of the image scanner-reader shown in FIG. 3.

As shown in FIG. 4, when the image data buffer 7 becomes full of data and cannot receive more data, the relative speed between the original document 10 and the photoelectric reader 1 (moving speed of the photoelectric reader 1 or original document 10) is, for example, decreased to ½ of the normal speed. Namely, in the same period, both areas I and II are moved by the normal speed, and only area I is moved by the decreased speed (½) when the image data buffer 7 becomes full. Note, when the relative speed between the original document 10 and the photoelectric reader 1 is at the normal speed, the resolution value of the resolution conversion circuit 9 is determined to be 800 dpi, and when the relative speed is at ½ of the normal speed, the resolution value of the resolution conversion circuit 9 is determined to be 400 dpi. In the above descriptions, the original document 10 may be moved (which is shown in FIG. 7) instead of moving the photoelectric reader 1.

Namely, as shown in FIG. 5, the original document 10 is moved at a normal speed in the direction of an arrow mark and is read at a resolution of 400 dpi. If the image data buffer 7 becomes full at a location Lo, the read operation is suspended. The motor for moving the original document is restarted at a reduced speed of, for example, ½ of the normal speed. Accordingly, an area 101 of the original document 10 is read at a resolution of 800 dpi. The resolution conversion circuit 9 converts this resolution (800 dpi) into 400 dpi. If the image data buffer 7 again becomes full even at the reduced speed, to suspend the read operation, the speed of the motor is further reduced by 1/m (m being an integer larger than 1) as shown in FIG. 6. For example, the speed of the motor 14 is reduced to ⅓, ¼, . . . of the first speed (normal speed). Accordingly, the resolution in a feed direction is reduced to ⅓, ¼, . . . of the first resolution.

The operation of the image scanner-reader shown in FIG. 3 will be explained for the case of moving the photoelectric reader 1 by the motor 14 and of including the speed switching and decision circuit 11, the speed switching unit 12, and the motor control unit 13 into the controller 4.

The light source 2 irradiates the original document 10 in order to transfer image data of the original document 10. The CCD circuit 5 on the printed circuit board 3 receives a reflection from the original document 10 and converts the reflection into analog signals. The image processing circuit 6 once converts the analog signals into multivalue digital signals and then into binary image data. The image data has a resolution of, for example, 400 dpi (dot per inch) in a feed direction and is transferred to the resolution conversion circuit 9.

The controller 4 operates the resolution conversion circuit 9 in a through mode at first. Accordingly, the image data is passed to the interface circuit 8 through the resolution conversion circuit 9 with no conversion being made on the image data. The image data is once stored in the image data buffer 7 and then transmitted to a host device.

Image data is successively accumulated in the image data buffer 7 and transmitted to the host device. If the quantity of data transmitted to the host device decreases due to some reason, the image data buffer 7 becomes full and cannot receive more data.

This suspension state is communicated to the controller 4 through the interface circuit 8. The controller 4 suspends the read operation. The controller 4 controls the motor 14 for moving the photoelectric reader 1 and the resolution conversion circuit 9 as shown in FIG. 6 and restarts the read operation. For example, the read operation is restarted with n=2 and m=1. As a result, the moving speed of the photoelectric reader 1 (relative speed between the original document 10 and the photoelectric reader 1) is halved, and therefore, the image processing circuit 6 provides image data of 800 dpi instead of the previous 400 dpi.

At this time, the controller 4 changes the resolution conversion rate of the resolution conversion circuit 9 to ½ of the previous ratio. Accordingly, the image data of 800 dpi provided by the image processing circuit 6 is converted into image data of 400 dpi, which is stored in the image data buffer 7 through the interface circuit 8 at an accumulation speed of ½ of the previous speed.

If the processing speed of the host device does not improve even if data accumulation speed is decreased, and if the image data buffer 7 again becomes full, this state is communicated to the controller 4. The controller 4 further decreases the motor speed to 1/(n+m), e.g., ⅓ of the first speed. At the same time, the resolution conversion rate of the resolution conversion circuit 9 is changed to ⅓ of the first conversion rate.

The resolution conversion circuit 9 may employ, for example, any one of the following techniques (1) to (3). The present invention, however, is not limited to these techniques. Any other technique may be employable.

(1) The area 101 shown in FIG. 5 is read at 800 dpi and then converted into 400 dpi.
(2) The areas 101 and 102 shown in FIG. 5 are read at 800 dpi and only the area 101 is converted into 400 dpi.
(3) The areas 101 and 102 shown in FIG. 5 are read at 800 dpi. Dot concentrations of the areas are added to each other and averaged ((area 101)+(area 102))/2.

Note, in the above technique (2), the area where image data is discarded will provide a white line. However, this is invisible to human eyes because the collective width of the areas 101 and 102 is equal to the width of one scan line in a feed direction at a normal resolution of 400 dpi. Namely, in the techniques (1) and (2), the amount of required hardware (circuit scale) can be small, and accordingly the cost for the image scanner-reader applying the techniques (1) or (2) can be decreased. Further, in the technique (3), the data is averaged and the quality of the image becomes high.

FIG. 7 shows another embodiment of an image scanner-reader using a reading method according to a first aspect of the present invention. In FIG. 7, reference numeral 15 denotes a motor, 40 denotes a controller, and 50 denotes a CCD reading speed adjust circuit. Note, the motor 15 is used to move the original document 10.

The CCD reading speed adjust circuit 50 adjusts the reading speed of CCDs (CCD circuit 5). This CCD reading speed adjust circuit 50 includes the CCD circuit 5 shown in FIG. 3.

As shown in FIG. 7, the remaining capacity decision unit 111 detects the remaining capacity of the image data buffer 7, and when the remaining capacity decision unit 111 detects that the remaining capacity of the image data buffer 7 is zero, or the image data buffer 7 becomes full of data and cannot receive more data, the decelerate speed calculation unit 112 receives an output signal of the remaining capacity decision unit 111 and calculates the deceleration speed.

The speed switching unit 12 receives an output of the decelerate speed calculation unit 112 receives and switches the speed, and the motor control unit 13 control the motor 15 in accordance with an output signal of the speed switching unit 12. Consequently, the speed of the motor 15 (moving speed of the original document 10) is, for example, decreased to ½ of the previous speed.

Further, as shown in FIG. 7, the image data buffer 7 is used to temporarily store image data composed of the binary values provided by the image processing circuit 6. When the image data buffer 7 becomes full of data and cannot receive more data, the controller 4 controls the CCD reading speed adjust circuit 50 to adjust (decrease) the reading speed of CCD circuit 5, so that the reading speed of CCD circuit 5 is halved. Namely, the controller 4 provides the CCD reading speed adjust circuit 50 with an instruction to change the reading speed of CCD circuit 5. For example, the CCD reading speed adjust circuit 50 reduces the reading speed of CCD circuit 5 to 1/n (n being an integer equal to or greater than 2).

Namely, when the speed of the motor 15 is decreased to 1/n, the reading speed of CCD circuit 5 is changed to 1/n. Further, the moving speed of the original document 10 is a relative speed between the original document 10 and the photoelectric reader 1.

Note, the speed switching and decision circuit 11, speed switching unit 12, and motor control unit 13 may be included in the controller 4. Namely, the controller 4 may control the motor 15 for moving the original document 10, and also control the reading speed of CCD circuit 5 through the CCD reading speed adjust circuit 50.

FIGS. 8A, 8B, and 9 are diagrams for explaining the operations of the image scanner-reader shown in FIG. 7. Note, FIG. 8A shows a normal operation, and FIG. 8B shows an operation when halving CCD's reading speed of the normal operation shown in FIG. 8A. Namely, in FIG. 8A, reference marks (TC1) and (TC2) represent the normal operation, where the mark (TC1) shows reading operations of the CCDs of each line and the mark (TC2) shows each pulse applied to the motor 15 to feed the original document 10. Further, in FIG. 8B, reference marks (TC3) and (TC4) represent the operation when halving CCD's reading speed of the normal operation, where the mark (TC3) shows reading operations of the CCDs of each line and the mark (TC4) shows each pulse applied to the motor 15 to feed the original document 10.

When an image data buffer 7 becomes full, the read operation is suspended. As indicated with the reference mark (TC4 of FIG. 8B), the controller 40 doubles the period of each drive pulse of the motor compared with the pulse of the normal case (TC2 of FIG. 8A). Accordingly, the moving speed of the original document 10 is halved. At the same time, the controller 40 halves the reading speed of the CCDs (CCD circuit 5) through the CCD reading speed adjust circuit 50. As a result, the CCDs read each line over a period (TC3 of FIG. 8B) that is twice as long as the normal period (TC1 of FIG. 8A).

Therefore, when the read operation is suspended, i.e., when the image data buffer 7 becomes full, the motor speed is halved to double the feed period (feed time). Namely, the CCD's reading speed is halved to double a line read period. When the read operation is restarted, the quantity of data transmitted to the image data buffer 7 per a unit period (time) will be halved.

FIG. 9 shows control conditions of the controller 40 in the image scanner-reader shown in FIG. 7. For the occurrence of a first suspension state, the controller 40 follows the conditions stated in a corresponding row of the figure (n=2, for example). For the occurrence of a second suspension state following the first suspension state, the controller 40 follows the conditions stated in a corresponding row of the figure (m=1, for example). In this way, the read operation is continued with the quantity of data transmitted to the image data buffer 7 being successively reduced.

Next, a modification of the image scanner-reader using a reading method of the first aspect will be explained.

The modification of the image scanner-reader using a reading method of the first aspect starts to read an original document at a normal reading speed of, for example, 400 dpi. When an image data buffer becomes full to cause a suspension state, a controller 40 (4) changes the read speed to restart the read operation according to the quantity of data transferred to a host device, the capacity of the image data buffer, and the following equation.

(Read speed)=(quantity of data transferred to host device)÷(total quantity (total size) of image buffer)

In this equation, the numerator, i.e., the quantity of data transferred to the host device is the quantity of data transferred to the host device during a period from a restart after the occurrence of a suspension state to the next occurrence of the suspension state. This idea is applicable for the first and second embodiments, to reasonably adjust a read speed.

FIG. 10 shows a read operation of the first aspect of the present invention, and FIG. 11 shows another read operation of the first aspect of the present invention.

In the above descriptions, the read operation is carried out one time for each of the original document 10. Nevertheless, the same original document 10 may be read several times, or a plurality of original documents 10 may be successively read. Namely, a read operation may be repeated several times according to, for example, the first embodiment. Note, for example, to change the density (concentration) of the image data of the original document 10, the same original document 10 is read several times.

As shown in FIG. 10, each of the first, second, and the following read operations is started at a predetermined read speed set for an image scanner. The read speed and a resolution conversion rate are controlled to 1/n for a first occurrence of a suspension state, 1/(n+m) for a second occurrence of the suspension state, and so on.

In FIG. 11, a first read operation is started at a read speed set for an image scanner, and each of the second and the following read operations is started at a read speed that is equal to the last reading speed of the preceding read operation. This idea is also applicable for the first aspect of the present invention.

Figure 12:
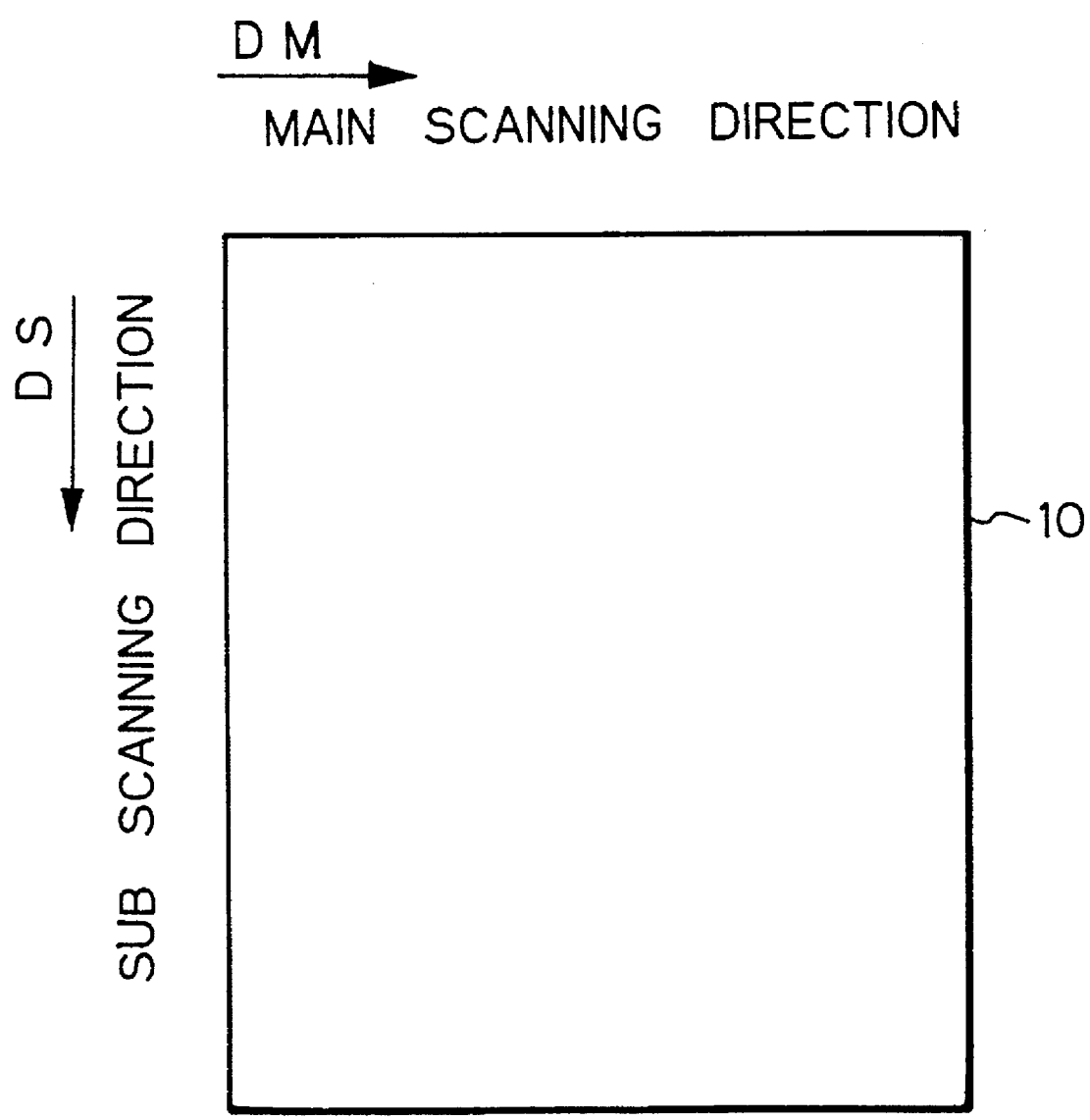
FIG. 12 is a diagram for explaining a scanning operation of the first aspect of the present invention.

FIG. 12 shows a scanning operation of the first aspect of the present invention, and FIGS. 13A to 13D are timing charts for explaining a scanning operation of the first aspect of the present invention. In FIGS. 13B and 13D, references M11 to M16 and M21 to M24 denote timing points for driving the motor (pulse motor) 14 or 15.

As shown in FIG. 12, the image of the original document 10 is read by a main scanning direction DM and a sub scanning direction DS. The main scanning direction DM corresponds to the scanning direction of the CCD (CCD circuit 5), and the scanning time of the CCD is determined in accordance with a clock signal for driving the CCD. Further, the sub scanning direction DS corresponds to the moving direction of the original document 10 or the photoelectric reader 1.

In the above descriptions, for example, when the image data buffer 7 becomes full, the speed of the motor 15 (moving speed of the original document 10) is decreased to 1/n of the previous speed, where "n" is an integer equal to or greater than 2. However, the "n" is not limited to an integer, but can be any real number (positive number). Namely, as shown in FIGS. 13A to 13D, when the speed of the motor 15 (or motor 14) is decreased to 1/1.5 of the previous speed. Concretely, as shown in FIGS. 13B and 13D, when the time period T2 between the timing points M21 and M22 is one and a half times as long as the time period T1 between the timing points M11 and M12, the scanning time T1 of the CCD (FIG. 13A) is increased to the scanning time T2 of the CCD (FIG. 13C). Namely, when the speed of the motor 14 (15) is decreased to 1/1.5 of the previous speed, or the time period (T2) of the motor driving pulse signal is increased to 1.5 times of the previous time period (T1), the time period of the clock signal for driving the CCD is increased 1.5 times of the previous one. Consequently, in this case, when the "n" is not an integer but a real number, data of the original document 10 can be read without changing the resolution thereof.

As described above, according to the first aspect of the image scanner-reader of the present invention, a read operation is suspended when an image data buffer becomes full and causes a suspension state, and the read operation is restarted after changing control conditions, so that the quantity of data transferred to the image data buffer is reduced. Further, the number of occurrences of the suspension state is greatly reduced, and thereby the overall speed of the reading operation can be decreased without increasing the data receiving speed of a host device.

Next, the problems of the prior art in relation to a second aspect of the present invention will be explained, with reference to FIG. 14.

An image scanner-reader of an image processing system has photoelectric conversion elements such as CCDs to read image data from an original document. According to instructions from a host device, the image data is processed. For example, the resolution of the image data is converted, the image data is compressed, or the image data is rotated. When executing these instructions such as the resolution conversion, compression, and rotation instructions from the host device, the prior art must read the original document through the scanner every time.

The resolution or the intensity level of a display screen (usually, a display unit) of a host computer greatly deviates from that of an image scanner. For example, the display unit usually involves about 70 dpi and 16 intensity levels, while the image scanner involves about 300 to 400 dpi and 256 intensity levels. The resolution of image data to be stored is increasing year by year.

Figure 14:
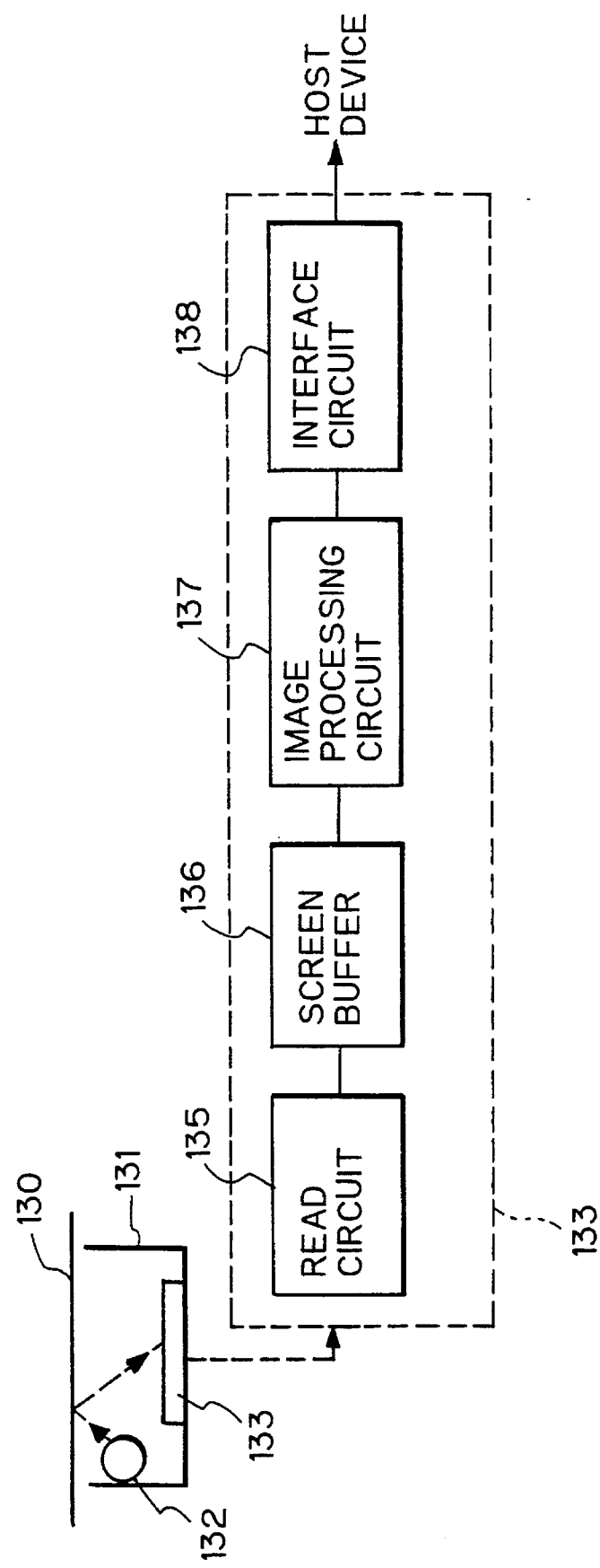
FIG. 14 is a block diagram showing another example of an image scanner-reader according to the prior art.

FIG. 14 shows another example of an image scanner-reader according to the prior art. In FIG. 14, reference numeral 130 denotes an original document, 131 denotes a photoelectric reader, 132 denotes a light source, and 133 denotes a printed circuit board.

The photoelectric reader 131, which includes the light source 132 and the printed circuit board 133, is used to read the original document 130 and provide image data thereof. The light source 132 is used to irradiate the original document 130, and the printed circuit board 133 is used to receive reflected light and provide image data.

The printed circuit board 133 has a read circuit 135, a screen buffer 136, an image processing circuit 137, and an interface circuit 138. The read circuit 135 includes CCDs and a CCD control circuit for controlling the CCDs. The screen buffer 136 is used to store image data provided by the read circuit 135. The image processing circuit 137 is used to carry out processes such as resolution conversion, compression, and rotation on the image data. Namely, the image processing circuit 137 of the second aspect is not only used to convert an output of the read circuit 135 into digital values and convert the digital values into binary signals, but also used to carry out various processes. The interface circuit 38 is used to send and receive data to and from a host device.

Note, the image scanner-reader has a resolution of 300 to 600 dpi. When the resolution of the image scanner-reader is, for example, 300 dpi and when the host device provides a 75-dpi read instruction, the image scanner-reader reads the original document 130 and provides image data of 300 dpi. The image data is once stored in the screen buffer 136 and is then converted into image data of 75 dpi by the image processing circuit 137. The image data of 75 dpi is transmitted to the host device through the interface circuit 138.

When the host device continuously sends an instruction to transmit 30-degrees-rotated image data of the original document 130, the image scanner-reader again reads the original document, stores read image data in the screen buffer 136, rotates the data by 30 degrees in the image processing circuit 137, and sends the rotated data to the host device.

In this way, the prior art must repeatedly read the original document for each of consecutive instructions such as resolution conversion, compression, and rotation instructions that are provided from the host device for the same original document. This raises a problem of elongating an image processing period.

Figure 15:
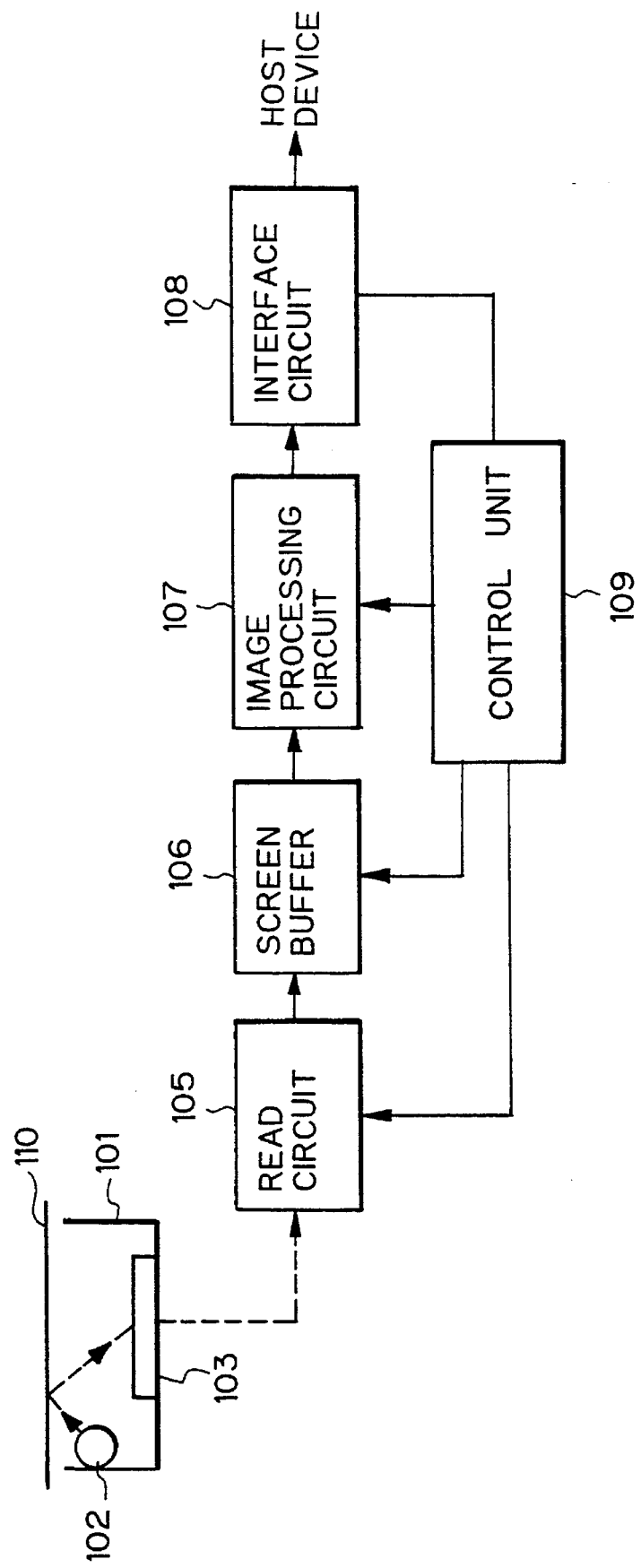
FIG. 15 is a block diagram showing a principle configuration of an image scanner-reader according to a second aspect of the present invention.

FIG. 15 shows a principle configuration of an image scanner-reader according to a second aspect of the present invention. In FIG. 15, reference numeral 110 denotes an original document, 101 denotes a photoelectric reader, 102 denotes a light source, and 103 denotes a printed circuit board. Note, the photoelectric reader 101 corresponds to the photoelectric reader 131 of FIG. 14, the light source 102 corresponds to the light source 132, the printed circuit board 103 corresponds to the printed circuit board 133. As shown in FIG. 15, the image scanner-reader of the second aspect of the present invention further comprises a control unit 109.

The image scanner-reader of the second aspect of the present invention reads the original document 110 with the read circuit 105 upon receiving an instruction from a host device. The read circuit 105 has photoelectric conversion elements such as CCDs. The read data is stored in the screen buffer 106 at, for example, 300 dpi that is a normal resolution of the photoelectric reader 101. According to the contents of the instruction from the host device, the controller 109 operates an image processing circuit 107. Image data requested by the first instruction from the host device is transmitted to the host device through the interface circuit 108. At this time, the data stored in the screen buffer 106 is not erased. If the host device provides another instruction such as a rotation instruction, the controller 109 interprets the instruction and lets the image processing circuit 107 work according to the instruction. Resultant data is transferred to the host device. In this way, the read data stored in the screen buffer 106 is kept until the host device provides an end instruction.

In response to a first instruction from the host device, the original document 110 is read, and the read data is stored in the screen buffer 106. This data is held until an end instruction is received. Accordingly, the second and the following instructions are carried out on the read data stored in the screen buffer 106. Unlike the prior art (FIG. 14) that reads image data for every instruction, the second aspect of the present invention is capable of handling a plurality of instructions in a shorter time.

An embodiment of the second aspect of the present invention will be explained with reference to FIGS. 16, 17, and 18A to 18C.

Figure 16:
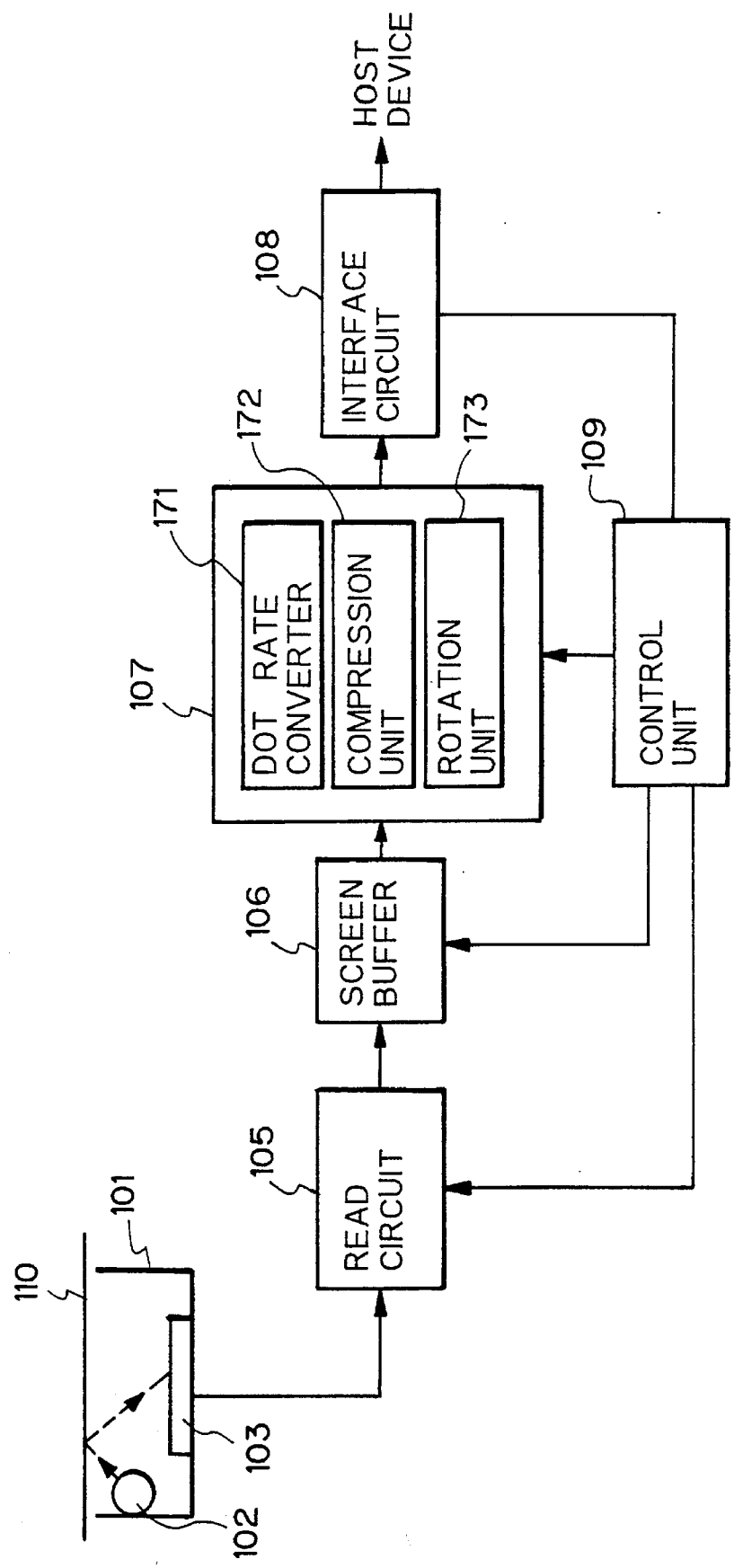
FIG. 16 is a block diagram showing an embodiment of an image scanner-reader according to a second aspect of the present invention.
Figure 17:
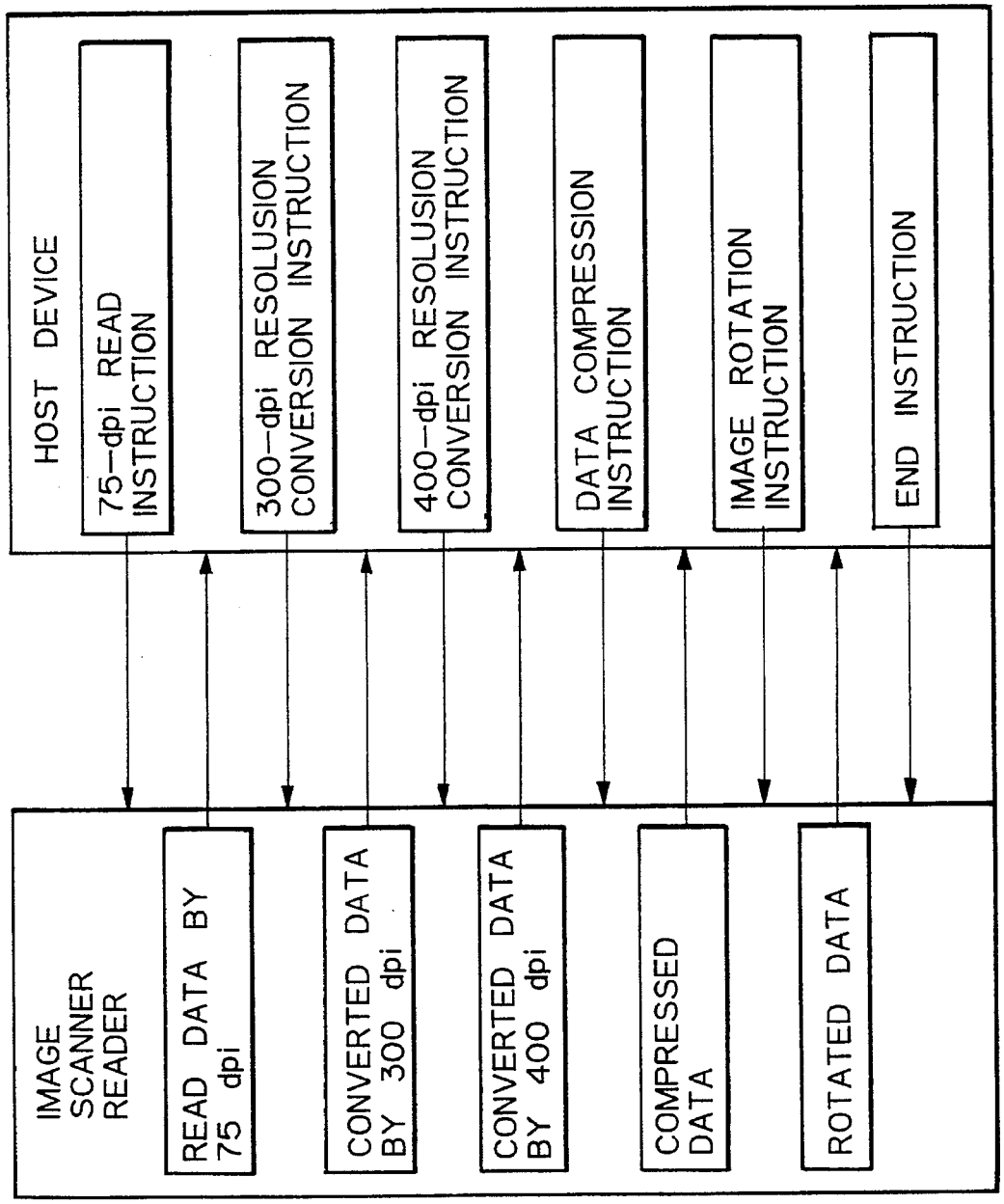
FIG. 17 is a diagram for explaining the operations of the image scanner-reader shown in FIG. 16.

FIG. 16 shows an embodiment of an image scanner-reader according to a second aspect of the present invention, and FIG. 17 shows the operations of the image scanner-reader shown in FIG. 16. Note, in FIG. 16, the same reference numerals as those of FIG. 15 denote the same elements thereof.

The controller 109 interprets and executes instructions provided by a host device. In response to a first instruction, the controller 109 reads the original document 110 and provides image data. The image data is processed in the image processing circuit 107. Upon receiving an end instruction, the controller 109 erases the image data stored in the screen buffer 106.

The image processing circuit 107 processes image data stored in the screen buffer 106 and transmits the processed data to the host device through the interface circuit 108. The image processing circuit 107 is composed of, for example, a dot rate converter 171, a compression unit 172, and a rotation unit 173. The image processing circuit 107 may pass the image stored in the image buffer 106 as it is without processing the data. The quality of an image will not be improved even if the resolution thereof is heightened. An object of resolution conversion is not to provide a clearer image but to simply provide an enlarged image.

The operation of the second aspect of the present invention with respect to instructions provided by the host device will be explained with reference to FIG. 17.

(I) The host device provides a 75-dpi read instruction. The instruction is transferred to the controller 109 through the interface circuit 108. The controller 109 interprets the instruction, and accordingly, activates the read circuit 105 to read image data at 600 dpi. The read image data is stored in the screen buffer 106. The controller 109 controls the dot rate converter 171 to convert 600 dpi into 75 dpi. The image data stored in the screen buffer 106 is thus converted to image data of 75 dpi, which is transferred to the host device through the interface circuit 108. The reading capacity of the scanner is 600 dpi.

(II) The host device provides a 300-dpi resolution conversion instruction. The controller 109 interprets the instruction. The controller 109 recognizes that this instruction is not the first instruction, and therefore, directly controls the dot rate converter 171 to convert 600 dpi into 300 dpi. As a result, the image data stored in the screen buffer 106 in the above process (I) is converted into image data of 300 dpi, which is transmitted to the host device through the interface circuit 108.

(III) The host device sequentially provides a 400-dpi resolution conversion instruction, a data compression instruction, and an image rotation instruction. The dot-rate converter 171 operates accordingly, so that the image data stored in the screen buffer 106 is converted into image data of 400 dpi, which is transmitted to the host device. The compression unit 172 compresses the image data at an instructed compression rate, and the compressed data is transmitted to the host device. The rotation unit 173 operates in response to the rotation instruction, to rotate the image data stored in the screen buffer 106 at an instructed rotation angle, and the rotated data is transmitted to the host device.

(IV) In this way, proper processes are carried out according to instructions, and required image data are transmitted to the host device. When the host device provides an operation end instruction, the controller 109 erases the image data stored in the screen buffer 106. When the host device provides another instruction, image data is newly read.

The host device may provide instructions for divided parts of a screen, respectively. In this case, image data is divided and each process is carried out on each divided unit. This may reduce the size of the screen buffer 106 to less than a full screen capacity.

FIGS. 18A, 18B, and 18C show the operations of the image scanner-reader shown in FIG. 16, and more concretely, FIGS. 18A to 18C explain an enlargement process for enlarging image data read at 600 dpi to data of 1200 dpi, carried out in the dot rate converter 171 of the image processing circuit 107.

In FIG. 18A, the image data read at 600 dpi includes regions A1, A2, A3, . . . , B1, B2, B3, etc. This data is converted into data of 1200 dpi shown in FIG. 18B. In this case, each of the regions A1, A2, B1, B2, etc., is converted into a region having an area twice as large as the original document area.

The regions A1, A2, B1, B2, etc., are allocated as shown in FIG. 18B. In FIG. 18C, a region ① is calculated as an average of A1 and A2, a region ② is an average of A2 and A3, a region ③ is an average of A1 and B1, a region ④ is an average of ① and ⑦, and so on. Any other dot rates may be employable for converting image data. In this case, conversion equations for other dot rates are prepared in advance, and according to the equations, the conversion is carried out.

A second embodiment of the second aspect of the present invention will be explained with reference to FIG. 19.

FIG. 19 shows an embodiment of another image scanner-reader according to a second aspect of the present invention. As shown in FIG. 19, a reader 115 for reading an original document and a converter 116 for carrying out a conversion process are separately arranged. Note, in FIG. 19, the same reference numerals as those of FIG. 16 denote the same elements thereof. Note, a first interface circuit 104 is arranged in the reader 115, and a second interface circuit 108 is arranged in the converter 116.

Similar to the read circuit 105 of FIG. 16, a read circuit 151 has CCDs and a CCD control circuit for controlling the CCDs. An image processing circuit 152 prepares multiple values from analog image data provided by the read circuit 151 and provides digital signals. Namely, the read circuit 151 and image processing circuit 152 correspond to the read circuit 105 of FIG. 16.

As explained above, the image processing circuit 152 prepares digital signals from image data. The digital image data is once stored in an image buffer 106 of the converter 116 through the interface circuit 104. Operations for instructions provided by a host device are the same as those explained with reference to FIGS. 16, 17, and 18A to 18C. Accordingly, their explanations will be omitted for the sake of simplicity. According to the second embodiment of the second aspect of the present invention, the host device may transmit image data to the image scanner-reader. The image data is temporarily stored in the screen buffer 106, and required processes such as resolution conversion, compression, expansion, and rotation may be carried out on the image data. The processed image data is then sent back to the host device. In the above explanation, image data is read at 600 dpi. The present invention is not limited to this.

According to the second aspect of the present invention, image data is temporarily stored in a buffer, and the stored image data is processed in accordance with instructions provided by a host device. Unlike the prior art, the second aspect of the present invention does not require image data to be read for each instruction from the host device. Namely, the second aspect of the present invention is capable of carrying out a plurality of instructions in a very short time on the same image data.

Many different embodiments of the present invention may be constructed without departing from the spirit and scope of the present invention, and it should be understood that the present invention is not limited to the specific embodiments described in this specification, except as defined in the appended claims.

We claim:

1. An image scanner-reader comprising:

image read means for reading an original document and producing image data, having a resolution, of said original document, said image read means comprising:

a light source for irradiating said original document, and a printed circuit board receiving reflected light from said original document and producing said image data of said original document, said printed circuit board comprising:

a buffer memory storing said image data, and resolution conversion means for lowering the resolution of said image data provided by said image read means if a relative moving speed between said original document and said image read means is decreased, said resolution being lowered only if the buffer memory is filled substantially to capacity; and employing control means, coupled to the image read means, for controlling a relative moving speed between said original document and said image read means, said employing control means lowering the relative moving speed only if the buffer memory is filled substantially to capacity, wherein if an original document reading operation is suspended, said employing control means controls a restart of the original document reading operation after decreasing the relative moving speed to a slow reading speed.

2. An image scanner-reader as claimed in claim 1, wherein said printed circuit board comprises CCD reading speed adjust means for adjusting a CCD scan speed, wherein said CCD reading speed adjust means decreases the CCD scan speed when the relative moving speed is decreased.

3. An image scanner-reader as claimed in claim 1, wherein a reading speed after the restart of the original document reading operation is determined depending on a quantity of data transmitted to a host device.

4. An image scanner-reader as claimed in claim 1, wherein said printed circuit board comprises:
- a CCD circuit;
- an image processing circuit, coupled to the CCD circuit, for converting an output of said CCD circuit into binary signals;
- an image data buffer for temporarily storing image data comprising the binary values produced by said image processing circuit; and
- an interface circuit, coupled to the image processing circuit and to the image data buffer, for transferring the image data into said image data buffer and transmitting the image data from said image data buffer to a host device.

5. An image scanner-reader as claimed in claim 1, wherein said employing control means comprises a motor for moving said image read means, and thereby controls the speed of said image read means.

6. An image scanner-reader as claimed in claim 1, wherein said employing control means comprises a motor for moving said original document, and thereby controls a speed of said original document.

7. A method of reading an original document by an image scanner-reader having image read means and an image data buffer, said method comprising the steps of:
- reading an original document and producing image data of said original document;
- suspending an original document reading operation, if said image data buffer becomes full of data and cannot receive more data; and
- decreasing a relative moving speed between said original document and said image read means and restarting the original document reading operation and lowering a resolution of the image data only if the image data buffer is filled substantially to capacity.

8. A method of reading original document as claimed in claim 7, wherein, when said image data buffer becomes full of data and cannot receive more data, a resolution of the binary data produced by said image read means is lowered in accordance with decreasing a relative moving speed.

9. A method of reading original document as claimed in claim 7, wherein, when said image data buffer becomes full of data and cannot receive more data, a CCD scan speed is decreased in accordance with decreasing the relative moving speed.

10. A method of reading original document as claimed in claim 7, wherein a reading speed after restarting the suspended read operation is determined depending on a quantity of data transmitted to a host device.

11. An image scanner-reader for processing image data from an original document, and transmitting processed image data to a host device transmitting a command including a first image data resolution and transmitting an end signal, said image scanner-reader comprising:
- read means for reading the original document and producing image data at a second image data resolution;
- a screen buffer, coupled to the read means, for storing image data of the original document read by the read means;
- image processing means, coupled to the screen buffer, for processing the image data stored in said screen buffer at the second image data resolution and for producing processed image data at the first image data resolution; and
- control means, coupled to the read means, the screen buffer, and the image processing circuit, for controlling the image processing means to convert the image data at the second image resolution to the processed image data at the first resolution and for erasing the image data stored in said screen buffer in response to the end signal, wherein all instructions before the end signal are executed on the image data stored in said screen buffer.

12. An image scanner-reader as claimed in claim 11, wherein said image processing means includes a plurality of processing means comprising resolution conversion means, rotation means, and compression means, each of said plurality of processing means being connected to said screen buffer.

13. An image scanner-reader as claimed in claim 11, wherein said image processing means comprises:
- resolution conversion means, coupled to the screen buffer, for converting resolution of the image data;
- rotation means, coupled to the screen buffer, for rotating the image data; and
- compression means, coupled to the screen buffer, for compressing the image data.

* * * * *

UNITED STATES PATENT AND TRADEMARK OFFICE
CERTIFICATE OF CORRECTION

PATENT NO. : 5,517,331
DATED : May 14, 1996
INVENTOR(S) : MURAI et al.

It is certified that error appears in the above-indentified patent and that said Letters Patent is hereby corrected as shown below:

Title Page, Column 2, change "Fan Lee" to --Cheukfan Lee--.

Title Page, In the Abstract, line 16, change "overal" to --overall--.

Column 1, line 40, change "can not" to --cannot--.

Column 1, line 47, after "Note", insert --that--.

Column 2, line 15, change "include" to --includes--.

Column 2, line 50, delete "to".

Column 5, line 21, change "send" to --sends--.

Column 9, line 30, change "i. e.," to --i.e.,--

Signed and Sealed this

Fifth Day of November, 1996

Attest:

BRUCE LEHMAN

*Attesting Officer*       Commissioner of Patents and Trademarks